May 29, 1956  C. E. HURLBURT  2,747,413
GYROSCOPE

Filed Dec. 15, 1954  2 Sheets-Sheet 1

INVENTOR.
CHARLES E. HURLBURT
BY
S. K. Hartz
ATTORNEY

May 29, 1956  C. E. HURLBURT  2,747,413
GYROSCOPE

Filed Dec. 15, 1954  2 Sheets-Sheet 2

INVENTOR.
CHARLES E. HURLBURT
BY
ATTORNEY

United States Patent Office 2,747,413
Patented May 29, 1956

2,747,413

GYROSCOPE

Charles E. Hurlburt, River Edge, N. J., assignor to Bendix Aviation Corporation, Teterboro, N. J., a corporation of Delaware Application December 15, 1954, Serial No. 475,349

9 Claims. (Cl. 74—5.2)

The invention relates to gyroscopes and more particularly to gyroscopes having three degrees of freedom, such as vertical gyroscopes and directional gyroscopes.

Such gyroscopes have a rotor adapted to spin about one axis and the rotor is mounted for angular movement about mutually perpendicular axes in inner and outer gimbals.

One of the difficulties encountered in three-degree of freedom gyroscopes is that, during rundown, that is, when the rotor is decelerating after the rotor motor is denergized, friction forces transmitted through the rotor bearings to the inner and outer gimbals tend to precess the gyroscope to align the rotor spin axis with the outer gimbal axis. The outer gimbal then spins with the rotor and the inner gimbal about the outer gimbal axis so that the outer gimbal bearings may be damaged.

One object of the present invention is to prevent the outer gimbal from spinning in the manner described above with possible damage to the gyroscope.

The invention contemplates a three-degree of freedom gyroscope having a spinning rotor mounted in inner and outer supports for angular movement about mutually perpendicular axes, and means for restraining angular movement of the outer support during rundown without entirely preventing such movement. This prevents the outer support from accelerating into a spin with the rotor when the rotor spin axis becomes aligned with the axis of rotation of the outer support. The means for restraining angular movement may comprise a yielding element adapted to engage a stop retractable from the path of the yielding element when the rotor is operating at normal speed.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for the purpose of illustration and description only, and are not intended as a definition of the limits of the invention.

In the drawings, Figure 1 is a vertical sectional view of a directional gyroscope constructed according to the invention and taken approximately on the line 1—1 of Figure 2.

Figure 1:
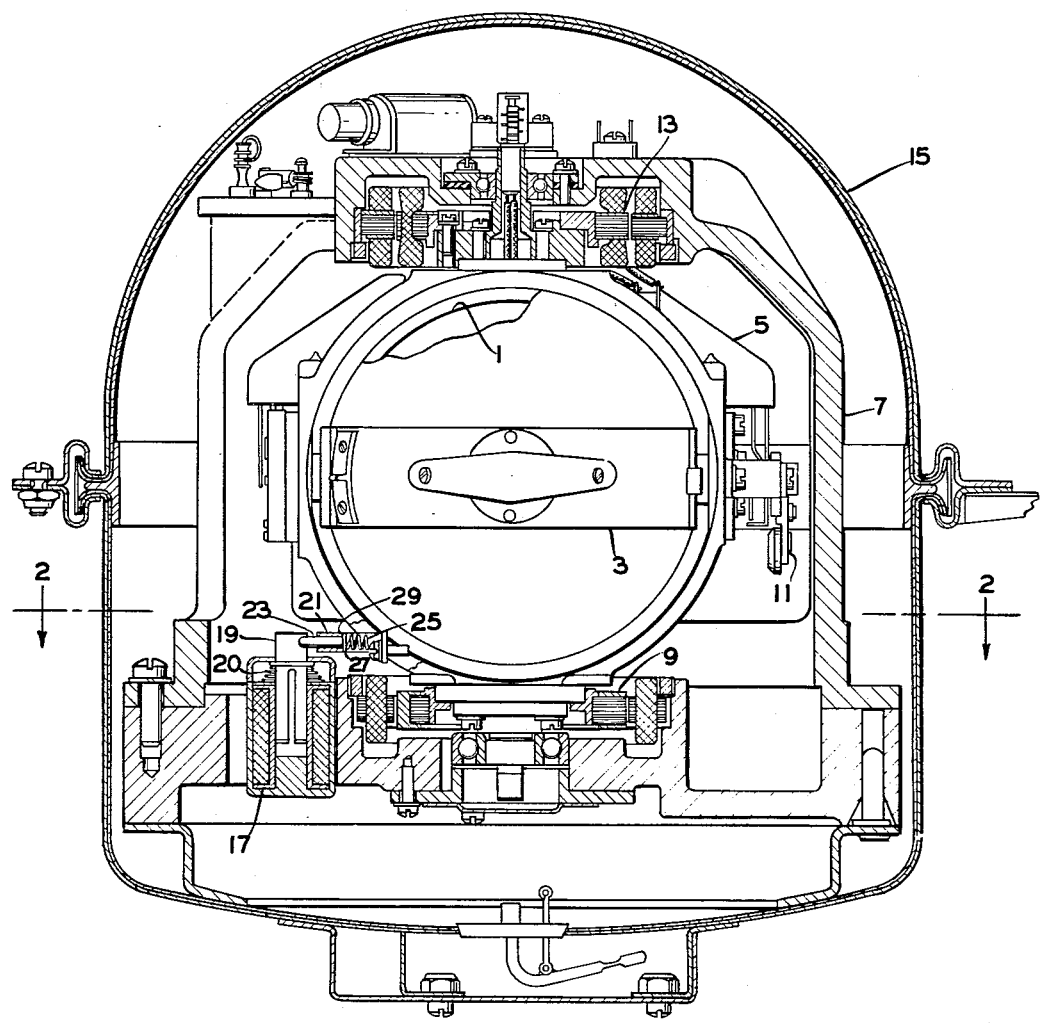
Figure 2:
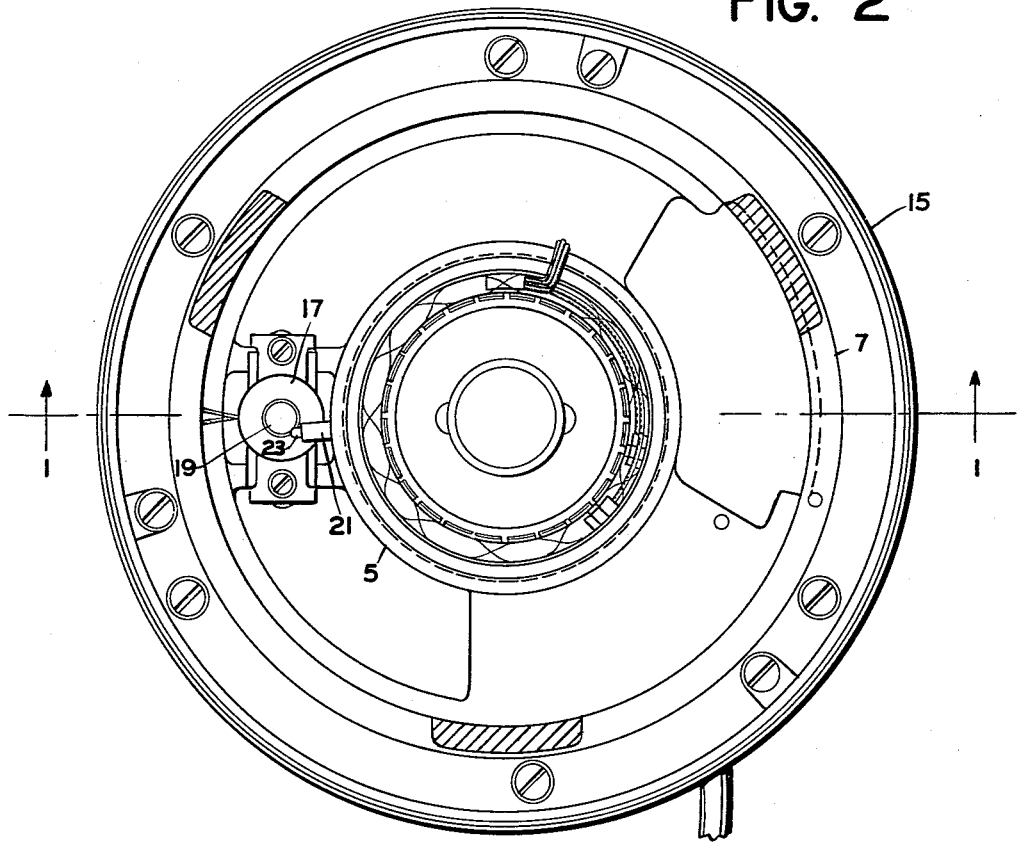
Figure 2 is a horizontal sectional view of the gyroscope taken approximately on the line 2—2 of Figure 1.

Referring now to Figures 1 and 2 of the drawings, the novel directional gyroscope shown therein comprises a rotor 1 spinning about a horizontal axis in an inner support or gimbal 3 mounted in an outer support or gimbal 5 for angular movement about an axis perpendicular to the spin axis. Outer gimbal 5 is mounted in a frame 7 for angular movement about an axis perpendicular to the axis of rotation of rotor support 3. The spin axis is maintained horizontal by an erection motor 9 controlled by a pendulous switch 11. A pickoff 13 has its rotor connected to gimbal 5 and its stator mounted on frame 7 to provide direction signals. A housing 15 secured to frame 7 encloses the gyroscope.

When the gyroscope motor (not shown) driving rotor 1 is de-energized, friction forces transmitted through the rotor bearings to the gimbals tend to precess the gyroscope in a manner to cause alignment of the rotor spin axis with the outer gimbal axis and the inner gimbal and outer gimbal spin with the rotor about the outer gimbal axis. This may cause serious damage to the instrument.

To prevent the outer gimbal from spinning in the manner described above, a solenoid 17 is mounted on frame 7 and controls operation of an associated plunger 19 slidably received in the solenoid and urged outwardly by a spring 20. When the rotor driving motor is de-energized the solenoid also is de-energized and plunger 19 is moved by spring 20 into the path of a yielding pin 23 on outer gimbal 5 to restrain angular movement of the gimbal and prevent it from spinning. A cylindrical member 21 is mounted on gimbal 5 and slidably receives pin 23 which is urged outwardly of member 21 by a spring 25 until a rib 27 on pin 23 engages a shoulder 29 in member 21. If the precession forces acting on the gyroscope are above a predetermined level, then pin 21 may retract against the force of spring 25 into member 21 and rid over plunger 19 to prevent damage to the gyroscope.

Pin 23 does not entirely prevent rotation of the outer gimbal as this might damage the gyroscope if the vehicle on which the gyroscope is mounted should turn while the rotor is decelerating after shut-down. When this occurs, pin 23 yields and rides over plunger 19 and permits frame 7 to turn due to gyro rigidity. The purpose is not to prevent the gimbal from turning entirely, but to prevent it from accelerating into a spin.

During normal operation of the gyroscope, when the rotor driving motor is energized, solenoid 17 is also energized and plunger 19 is retracted into the solenoid out of the path of pin 21 and gimbal 5 is free to rotate without restraint about its axis.

Figure 3:
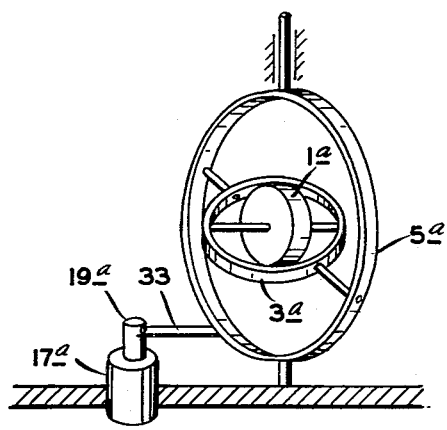
Figure 3 is a diagrammatic view showing another embodiment of the invention.

In Figure 3, another embodiment of the invention is shown diagrammatically and the gyroscope shown therein uses a spring 33 fixed to outer gambal 5a and engaging a plunger 19a controlled by a solenoid 17a. The embodiment of Figure 3 operates in the same manner as the embodiment shown in Figures 1 and 2 in that outer gimbal 5a will not accelerate into a spin with inner gimbal 3a and rotor 1a even if the spin axis of rotor 1a becomes aligned with the outer gimbal axis.

While the invention has been shown as being incorporated in a directional gyroscope it should be understood that the invention may also be incorporated in a vertical gyroscope or in any other gyroscope having three degrees of freedom.

Although but two embodiments of the invention have been illustrated and described in detail, it is to be expressly understood that the invention is not limited thereto. Various changes can be made in the design and arrangement of the parts without departing from the spirit and scope of the invention, as the same will now be understood by those skilled in the art. For example, the yielding pin 21 of Figures 1 and 2 or spring 33 of Figure 3 can be mounted on the frame and the solenoid and plunger can be mounted on the outer gimbal, or means other than shown may be used to interpose an obstruction in the path of the yielding element during rundown. Also, some gyroscopes are provided with stops for limiting movement of the inner gimbal relative to the outer gimbal and in such gyroscopes the inners gimbal will strike the associated stop when the spin axis is a few degrees out of alignment with the axis of rotation of the outer gimbal. The term "becomes aligned" as used in the specification and claims is intended to cover this condition as well as actual alignment when no stops are used.

What is claimed is:

1. In a device of the class described, a three-degree of freedom gyroscope having a spinning rotor mounted in inner and outer supports for angular movement about mutually perpendicular axes, and spring cushioned slide means carried by the outer support engageable yieldingly with a solenoid controlled plunger during rundown of the rotor for restraining angular movement of the outer support during rundown without entirely preventing such movement, said means preventing said outer support from accelerating into a spin with the rotor.

2. In a device of the class described, a three-degree of freedom gyroscope having a spinning rotor mounted in inner and outer supports for angular movement about mutually perpendicular axes, spring cushioned pin means engageable yieldingly with a cylindrical member for restraining angular movement of the outer support during rundown without entirely preventing such movement, said means preventing said outer support from accelerating into a spin with the rotor when the rotor spin axis becomes aligned with the axis of rotation of the outer support, and a solenoid control for removing the cylindrical member out of reach of the pin means when the rotor is operating at normal speed.

3. In a device of the class described, a three-degree of freedom gyroscope having a spinning rotor mounted in inner and outer supports for angular movement about mutually perpendicular axes, and means comprising a control stop automatically movable from an ineffective position to an effective position during rundown of the rotor and an element yieldingly engageable with the stop in its effective position for restraining angular movement of the outer support during rundown without entirely preventing such movement, said means preventing said outer support from accelerating into a spin with the rotor when the rotor spin axis becomes aligned with the axis of rotation of the outer support.

4. In a device of the class described, a three-degree of freedom gyroscope having a spinning rotor mounted in inner and outer supports for angular movement about mutually perpendicular axes, and means comprising a retractable stop and a yielding element adapted to engage the retractable stop for restraining angular movement of the outer support during rundown without entirely preventing such movement, said means preventing said outer support from accelerating into a spin with the rotor when the rotor spin axis becomes aligned with the axis of rotation of the outer support, and solenoid means normally retracting the stop during normal operation of the rotor to avoid such engagement by the yielding element.

5. In a device of the class described, a three-degree of freedom gyroscope having a spinning rotor mounted in inner and outer supports for angular movement about mutually perpendicular axes, and means comprising a yielding element adapted to engage a retractable stop for restraining angular movement of the outer support during rundown without entirely preventing such movement, said means preventing said outer support from accelerating into a spin with the rotor when the rotor spin axis becomes aligned with the axis of rotation of the outer support, and means for retracting said stop from the path of said yielding element when the rotor is operating at normal speed.

6. In a device of the class described, a three-degree of freedom gyroscope having a spinning rotor mounted in inner and outer supports for angular movement about mutually perpendicular axes, an electric motor for spinning said rotor, and means comprising a yielding element adapted to engage a retractable stop and restraining angular movement of the outer support during rundown without entirely preventing such movement, said means preventing said outer support from accelerating into a spin with the rotor when the rotor spin axis becomes aligned with the axis of rotation of the outer support, and a solenoid for retracting said stop from the path of said yielding means when the rotor driving motor is energized.

7. In a device of the class described, a three-degree of freedom gyroscope having a spinning rotor, a support mounting said rotor, a gimbal member mounting said support for angular movement at right angles to the spin axis of the rotor, a frame member mounting said gimbal member for angular movement at right angles to the axis of rotation of said support, and means for restraining angular movement of said gimbal member during rundown without entirely preventing such movement, said means comprising a yielding element mounted on one of said members and a retractable stop on the other of said members in the path of said yielding element during rundown, said yielding element engaging said stop to restrain angular movement of said gimbal member but riding over said stop when the gyroscope is acted upon by a predetermined force to avoid damage to the gyroscope, said means preventing said gimbal member from accelerating into a spin with the rotor.

8. In a device of the class described, a three-degree of freedom gyroscope having a spinning rotor, a support mounting said rotor, a gimbal member mounting said support for angular movement at right angles to the spin axis of the rotor, a frame member mounting said gimbal member for angular movement at right angles to the axis of rotation of the support, and means for restraining angular movement of said gimbal member during rundown but without entirely preventing such movement, said means comprising a pin urged yieldingly outwardly by a spring mounted on one of said members and a plunger on the other of said members in the path of said pin during rundown, said pin engaging said plunger to restrain angular movement of said gimbal member but riding over said plunger when the gyrosope is acted upon by a predetermined force to avoid damage to the gyroscope, said means preventing said gimbal member from accelerating into a spin with the rotor, and a solenoid operating said plunger to withdraw said plunger from the path of said pin when the rotor is operating at normal speed.

9. In a device of the class described, a three-degree of freedom gyroscope having a spinning rotor, a support mounting said rotor, a gimbal member mounting said support for angular movement at right angles to the spin axis of the rotor, a frame member mounting said gimbal member for angular movement at right angles to the axis of rotation of said support, and means for restraining angular movement of said gimbal member during rundown without entirely preventing such movement, said means comprising a spring-like element mounted on one of said members and a retractable plunger operated by a solenoid mounted on the other of said members in the path of said spring element, said spring element engaging said plunger to restrain angular movement of said gimbal member and riding over said plunger when the gyroscope is acted upon by predetermined forces to avoid damage to the gyroscope, said means preventing said gimbal member from accelerating into a spin with the rotor.

References Cited in the file of this patent

UNITED STATES PATENTS

| 2,200,976 | Bates | May 14, 1940 |
| 2,283,720 | Brandt | May 19, 1942 |
| 2,524,553 | Wendt | Oct. 3, 1950 |

FOREIGN PATENTS

| 625,415 | Great Britain | June 28, 1949 |